(12) United States Patent
Sarti

(10) Patent No.: US 10,680,461 B1
(45) Date of Patent: Jun. 9, 2020

(54) DATA CENTER POWER NETWORK WITH MULTIPLE REDUNDANCIES

(71) Applicant: Facebook, Inc., Menlo Park, CA (US)

(72) Inventor: Pierluigi Sarti, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/049,105

(22) Filed: Jul. 30, 2018

Related U.S. Application Data

(62) Division of application No. 14/873,585, filed on Oct. 2, 2015, now Pat. No. 10,063,092.

(51) Int. Cl.
*H02J 9/06* (2006.01)
*H02J 9/08* (2006.01)

(52) U.S. Cl.
CPC .............. *H02J 9/066* (2013.01); *H02J 9/061* (2013.01); *H02J 9/08* (2013.01)

(58) Field of Classification Search
CPC .............. H02J 9/066; H02J 9/061; H02J 9/08
See application file for complete search history.

(56) References Cited

U.S. PATENT DOCUMENTS

| | | | | |
|---|---|---|---|---|
| 4,536,126 A | * | 8/1985 | Reuther | H02J 3/42 290/40 R |
| 7,472,542 B2 | * | 1/2009 | Yamanaka | F02C 3/22 60/39.465 |
| 9,698,603 B2 | * | 7/2017 | Sugimoto | H01M 10/44 |
| 2010/0038907 A1 | * | 2/2010 | Hunt | E21B 41/0085 290/7 |

* cited by examiner

*Primary Examiner* — Dinh T Le
(74) *Attorney, Agent, or Firm* — FisherBroyles, LLP

(57) ABSTRACT

Several embodiments include a power network system for a data center. The power network system can provide high voltage direct current (HVDC) power to server racks or any IT load racks type. For example, a HVDC converter circuit can provide the HVDC power by converting AC power. The power network system can also include multiple redundant power systems (e.g., a genset, a capacitive backup power system, a turbine-based generator system, or any combination thereof). The capacitive backup power system can provide HVDC power when the AC power fails and/or when the HVDC converter circuit can no longer provide sufficient power. The genset can be turned ON after the AC power fails. However, the genset may not provide stable power until sometime thereafter. Hence, the air turbine-based generator system can provide nearly-instant backup power once turned ON and provide supplemental energy in combination with the capacitive backup power system to smooth out transitions of power sources.

20 Claims, 6 Drawing Sheets

800

Charge a capacitor-based backup power system utilizing HVDC power from a power grid
802

Compress air into an air tank coupled to a turbine-based generator
804

Detect a power failure of the grid-based power system due to an AC power failure of the power grid
806

Provide power from a capacitor-based backup power system to the server rack
808

Activate a turbine-based generator after detecting the power failure
810

Activate a genset after detecting the power failure
812

DATA CENTER POWER NETWORK WITH MULTIPLE REDUNDANCIES

CROSS REFERENCE TO RELATED APPLICATION

This application is a divisional of U.S. application Ser. No. 14/873,585, filed Oct. 2, 2015, the disclosure of which is incorporated, in its entirety, by this reference.

BACKGROUND

A data center is a practical solution for cloud computing or large-scale application services or data services in information technology (IT) operations. One of the challenges of a data center is to provide uninterrupted power to computer server racks in the data center. For example, it is sometimes difficult to operate a power system continuously because of potential power surges and power outages (e.g., including loss of AC power, blackouts or brownouts). A data center can provide a backup power solution to its computer server racks. For example, the backup power solution can include a backup power generator that provides sustainable power after a power outage occurs. Because backup power generators are generally diesel engines based (e.g., a "Genset," which is a combination of a diesel engine and an electric generator) and take time to start, the backup power generators oftentimes cannot supply power immediately after loss of main power, but normally after few tenths of seconds. Traditionally, after a power outage and before the genset backup power generator becomes fully operational, a backup battery system is used to provide backup power to the electrical load that would have been normally supported by the AC power grid. The battery power can be directly or indirectly supplied to computing devices or transformed to alternating current (AC), e.g., by using an inverter (e.g. UPS). However, batteries and battery systems have long term reliability problems unless they are frequently tested. Battery durability may be limited regardless, thus needing frequent replacements.

BRIEF DESCRIPTION OF THE DRAWINGS

FIG. 8 is a method of operating a power network system, in accordance with various embodiments.

Figure 1:
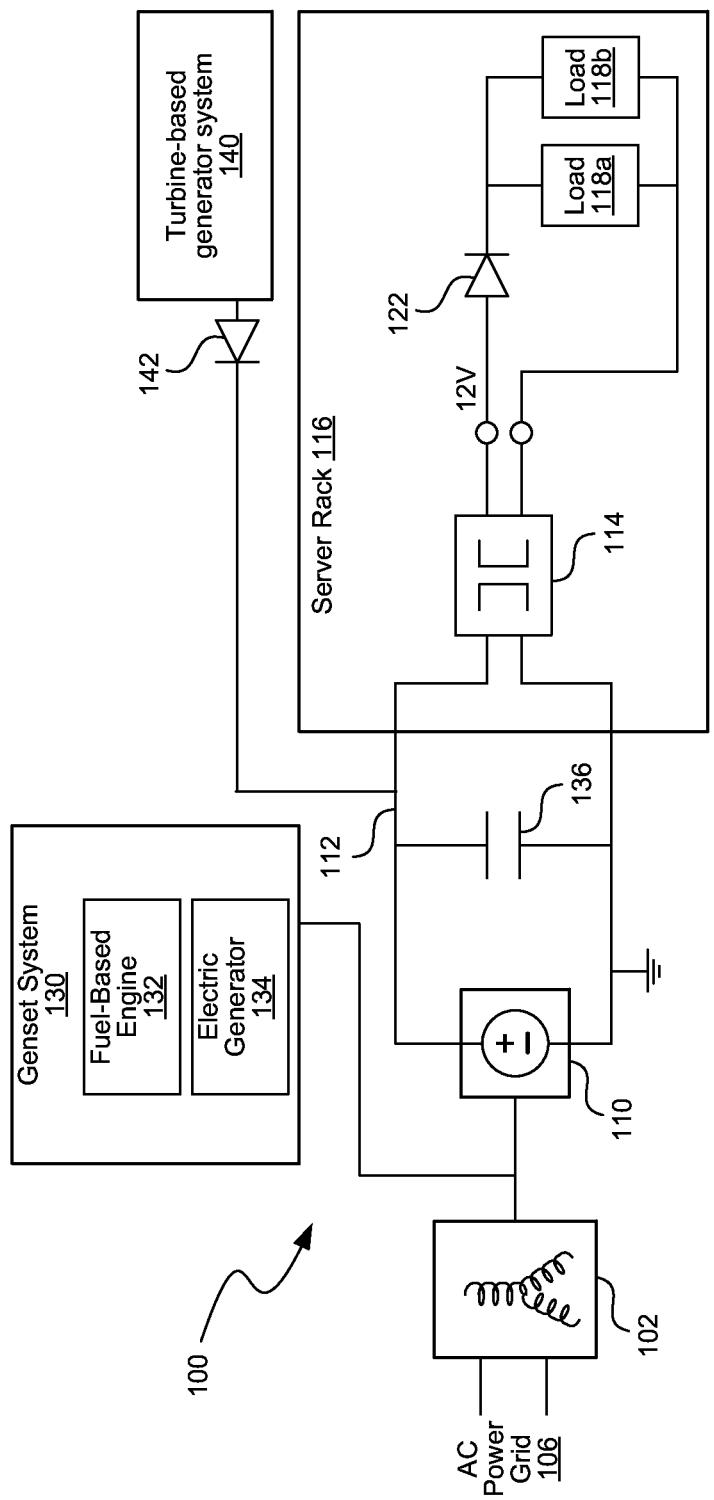
FIG. 1 is a circuit diagram illustrating a power network system for one or more server racks in a data center, in accordance with various embodiments.

The figures depict various embodiments of the disclosure for purposes of illustration only. One skilled in the art will readily recognize from the following discussion that alternative embodiments of the structures and methods illustrated herein may be employed without departing from the principles of the invention described herein.

DETAILED DESCRIPTION

Embodiments are disclosed for redundant power systems in a power network for a data center. The redundant power systems are used to provide bridging backup power to racks in the data center in case of alternating current (AC) power failure and before one or more generators ("genset") are fully operational. The redundant power systems can include a turbine-based generator (e.g., where a turbine driving an electric generator is powered by decompressing gaseous substance) and a capacitive backup power system electrically coupled in parallel with an asymmetric conductance component, or decoupled with a switch. The capacitive backup power system can include one or more capacitors (e.g., "supercapacitors"). A supercapacitor is a high-capacity electrochemical capacitor (e.g., electric double layer capacitor or other capacitors with very high nominal capacitance, greater than 100 Farads for voltage at or lower than 4V). The supercapacitors can bridge the gap between electrolytic capacitors and rechargeable batteries because they store at least 10 to 100 times more energy per unit volume or mass than electrolytic capacitors, accept and deliver electric charge much faster than batteries, and tolerate many more charge and discharge cycles than rechargeable batteries, and better temperature tolerant.

For example, the supercapacitors can be arranged in a series and/or in parallel in one or more modular capacitive units. Two or more circuit components are "in series" when the circuit components are connected in a single path, and the same electric current flows through all of the components along the single path. A simple passive network is always present to balance the voltage of all capacitors in series. Two or more circuit components are "in parallel" when the circuit components are connected so that the same electric voltage is applied across each component. Each modular capacitive unit can include one or more serial strings of capacitors in parallel with each other and with a diode and/or a transistor (e.g., MOSFET). A health monitoring circuitry may be added. For example, there can be enough capacitors to provide sufficient bridging power within a tolerable voltage range for a DC-DC converter stage of a rack up to 15 seconds at full load. Each server rack, or each power solution installed in the server rack, includes DC-DC converter stages to convert a high voltage DC (HVDC) power through a power line from the data center to a lower voltage usable by the electronic components in the server rack. These converter stages also work during normal condition when AC power grid is available.

Power Emergency Generators can be fuel-based (e.g., diesel, petroleum, or natural gas) and they need time to turn ON. A fast intermediated generator can be used, powered by compressed air, to bridge the time. In one example, at approximately three seconds after a continuous AC power outage, a tank storing compressed air or other gaseous substance begins to release the compressed air to a turbine generator and thereby causes the turbine-based generator to generate power. The turbine-based generator can provide supplemental power for the capacitors to extend the bridging power provided by the capacitors. For example, the charge of the capacitors can drop quickly while the turbine-based generator may generate less power as it is spooling up. Accordingly, the combined power provided by the capacitors and the turbine-based generator would be sufficient to power the server rack(s). At approximately six seconds after power failure, the turbine-based generator alone can generate enough bridging power for the entire electrical load of the racks. This can be sustained for up to 90 seconds after AC power failure (e.g., power outage). In this example, at approximately 4-6 seconds after the power failure is detected, the fuel based genset starts the turn-ON sequence. The genset can reach sufficient and stable power output (e.g., within a threshold minimum voltage and/or a threshold minimum power output) at approximately 25 seconds to 90 seconds (e.g., where 90 seconds is the worst case scenario) after the AC power failure. In one example, each row of the data center can share a HVDC turbine-based generator. In other examples, multiple rows (e.g., double rows or quad rows) can share a HVDC turbine-based generator. The HVDC turbine-based generator can be stationed at the roof of the data center, or just outside, enabling it to compress atmospheric air and enabling data center operators to release de-pressurized air openly.

Turning now to the figures, FIG. 1 is a circuit diagram illustrating a power network system 100 for one or more server racks in a data center, in accordance with various embodiments. The power network system 100 can utilize a three-phase power stage 102 from a power grid 106. The power grid 106 provides AC power. The three phase power stage 102 produces AC power for the data center or a portion of the data center. A HVDC converter circuit 110 can convert the AC power of the three phase power stage 102 into HVDC power. In some embodiments, the HVDC converter circuit 110 performs a power factor correction (PFC) as well. The HVDC converter circuit 110 can be a passive circuit or an active circuit. For example, the HVDC converter circuit 110 can include one or more rectifiers, one or more bridge-less circuits, one or more power factor correction modules, or any combination thereof. The HVDC converter circuit 110 can provide the HVDC power through a HVDC power line 112.

Computing devices commonly consume 12 VDC, but the HVDC converter circuit 110 produces a much larger voltage. A DC-DC converter 114 can convert DC electric power from a higher voltage (e.g., 250V to 440V) to a lower voltage (e.g., 12V). The DC-DC converter 114 can be part of a server rack 116. In some embodiments, the DC-DC converter 114 can still produce a specific lower voltage (e.g., 12V) that satisfies power requirements of the server rack 116 despite the higher voltage fluctuating within a preset range (e.g., 250V to 440V). The HVDC converter circuit 110 can be located outside the server rack 116, supporting one or more server racks. In some embodiments, the server rack 116 includes the HVDC converter circuit 110. The lower voltage DC power can support one or more electrical loads (e.g., an electrical load 118A and an electrical load 118B, collectively as the "electrical loads 118"). The electrical loads 118 can include one or more computing devices (e.g., computer servers), network equipment, one or more data storage devices, one or more cooling systems, other electrical components in the server rack 116, or any combination thereof. In some embodiments, the DC-DC converter 114 can be outside of the server rack 116 and produce lower DC voltage to support one or more server racks. In some embodiments, an asymmetric conductance component 122 (e.g., a diode or a transistor) ensures that current flows only in the direction from the DC-DC converter 114 to the electrical loads 118 and not vice versa.

When the power grid 106 provides uninterrupted power, the HVDC converter circuit 110 can provide sufficient power to keep the electronic components within the server rack(s) 116 operational. However, when an AC power failure (e.g., a blackout or a brownout of the power grid 106) occurs, the power network system 100 can rely on one or more backup power systems. The power network system 100 includes multiple backup power systems as power redundancies to ensure that the electrical loads 118 continuously receive power despite AC power failure.

For example, the power network system 100 includes a genset system 130. The genset system 130 can include a fuel-based engine 132 and an electric generator 134. In some embodiments, the fuel-based engine 132 in the genset system 130 is a diesel engine or a gasoline engine. The electric generator 134 can be an alternator, powered by the fuel-based engine 132 that generates AC power. For example, the electric generator 134 generates AC power similar to the three phase power stage 102 and compatible with the input of the HVDC converter circuit 110 (e.g., the HVDC converter circuit 110 can still produce HVDC power to the DC-DC converter 114 upon receiving the AC power from the genset system 130). In some embodiments, the HVDC converter circuit 110 can only function as a HVDC converter when the AC power from the three phase power stage 102 and from the genset system 130 satisfies certain electrical characteristics (e.g., a voltage range or threshold, a frequency range or threshold, etc.).

The genset system 130 can provide enough power to keep the electronic components within the server rack(s) 116 running for a long period of time (e.g., multiple minutes, hours, or days). However, the genset system 130 can take some time to become fully operational (e.g., capable of providing sufficient, stable and uninterrupted power to the electronic components within the server rack 116). As an example, the genset system 130 may take 25 seconds to a minute or longer before providing sufficient and stable power. Accordingly, in some embodiments, the power network system 100 includes additional redundant power system(s) to provide power after the power grid 106 fails, but before the genset system 130 becomes fully operational.

In the illustrated embodiments, the genset system 130 is coupled to the AC input of the HVDC converter circuit 110 (or could be coupled to the AC Power Grid, Medium Voltage). For example, the genset system 130 can output an AC power to be converted by the HVDC converter circuit 110 (or to feed the Medium Voltage transformer input). In other embodiments, the genset system 130 is coupled to the HVDC output (e.g., the HVDC power line 112) of the HVDC converter circuit 110. In these embodiments, the genset system 130 can include an AC-DC converter that converts the power output of the genset system 130 into HVDC power. In some embodiments, the electric generator 134 can be a dynamo generator that directly produces HVDC power. A dynamo generator is an electrical generator that produces DC with the use of a commutator.

The power network system 100 includes a capacitive backup power system 136 coupled to the HVDC power line 112. The HVDC converter circuit 110 powers the server rack(s) and keeps charged (e.g., divert a portion of its electric current to charge) the capacitive backup power system 136 when the power grid 106 is operational. In some embodiments, during peak power operation (e.g., when the demand for energy by the electrical loads 118 increases beyond the power output of the HVDC converter circuit 110), the capacitive backup power system 136 can temporarily supply additional electric current to supplement the HVDC converter circuit 110. When the power grid 106 fails, the capacitive backup power system 136 can provide the HVDC power to the server rack(s) 116 via the HVDC power line 112.

The capacitive backup power system 136 stores energy via one or more capacitors (e.g., super capacitors). In some embodiments, the capacitive backup power system 136 further includes one or more batteries in addition to the capacitors. The capacitive backup power system 136 includes sufficient energy storage units (e.g., the capacitors and/or the batteries) that provide enough power (e.g., HVDC power) to keep the electronic components within the server rack(s) 116 running for longer period of time (e.g. minutes) so to avoid usage of the turbine-based generator system 140. In one example, the capacitive backup power system 136 is adapted with enough power to keep the electrical load in the server rack 116 running for at least 12 to 15 seconds, with the turbine-based generator system 140 left to deliver the rest.

Conventionally, short-term backup power supply is provided solely via BBUs (Battery Backup Units). BBUs can provide nearly stable voltage levels reliably for an extended period of time and can be recharged. In several embodiments, the capacitive backup power system 136 provides the short-term backup power instead of the BBUs. The capacitive backup power system 136 advantageously provide a higher peak current (e.g., dI/dt) delivery as compared to the BBUs. In several embodiments, unlike the BBUs, the capacitive backup power system 136 does not require periodic testing and has a much longer lifetime (e.g., 15-20 years) as compared to BBUs (e.g., normally much less than 10 years). In some embodiments, the lifetime of the capacitors are extended by design by ensuring (e.g., configured by circuitry) that the capacitors are never fully charged to their maximum voltage rating. The capacitive backup power system 136 also has less or no safety issues compared to batteries inside the BBUs, for example, Li-Ion battery BBUs. The capacitive backup power system 136 can exhibit electrical inertial behavior during capacitor discharge. However, the capacitive backup power system 136 has a much faster voltage drop off as the capacitors therein discharges as compared to the BBUs. For example, an information technology (IT) load, such as a server load, is usually a constant power load, which is frequently the worst case load type for a discharging an energy storage device (e.g., a capacitor or a battery).

In some embodiments, the challenge of a fast voltage drop off is resolved partially by including one or more batteries in series with one or more capacitors in the capacitive backup power system 136. However, these batteries may also have to be tested periodically. In some embodiments, the power network system 100 includes a turbine-based generator system 140 to support the capacitive backup power system 136 after the power outage, but before the genset system 130 takes over. For example, the turbine-based generator system 140 can initially supplement the HVDC power provided by the capacitive backup power system 136 to the server rack 116 via the HVDC power line 112. The turbine-based generator system 140 can also become the sole provider of the HVDC power to the server rack 116 when the capacitive backup power system 136 is drained or substantially drained (e.g., six seconds to 15 seconds after AC power failure). The turbine-based generator system 140 can be coupled to another asymmetric conductance component 142 to prevent electric current backflow. The turbine-based generator system 140 can start-up very quickly, and very quickly deliver power.

In several embodiments, the power network system 100 advantageously moves a majority of power systems to the data center (e.g., outside of the server racks). Moving the power systems to the data center level enables easier maintenance of the power systems, and prevents the power systems from being swapped if/when the rack is swapped. The additional power redundancies further ensure that each power system can be serviced without interrupting the power supply to the server racks. For example, the HVDC converter circuit 110, the turbine-based generator system 140, the genset system 130, and the capacitive backup power system 136, or any combination thereof, may be stationed outside of the server racks in the data center. These components can be shared amongst multiple server racks. The power network system 100 can route HVDC power cables (e.g., as part of the HVDC power line 112) to the server racks. Whenever there is a power-related discrepancy, the data center administrators need not disturb the server racks in order to debug the power network system 100.

Figure 2A:
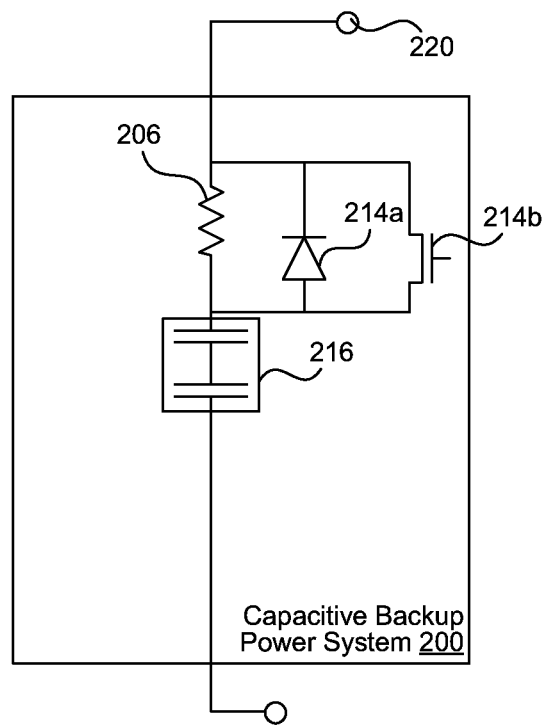
FIG. 2A is a circuit diagram illustrating a capacitive backup power system, in accordance with various embodiments.

FIG. 2A is a circuit diagram illustrating a capacitive backup power system 200, in accordance with various embodiments. The capacitive backup power system 200 can be considered a single capacitive module or a plurality of capacitive units in parallel, in series, or any combination thereof. The capacitive backup power system 200 can include a resistor 206 and an asymmetric conductance component (e.g., a diode 214A and/or a transistor 214B, collectively or independently as the "asymmetric conductance component 214"). The asymmetric conductance component 214 enables electric current to flow from an energy storage pack 216 towards a positive terminal 220 of the capacitive backup power system 200. The resistor 206 can be coupled between the energy storage pack 216 and a positive terminal 220. The positive terminal 220 can be coupled to a HVDC power line (the HVDC power line 112) or another capacitive backup power system. In some embodiments an electronic switching constant current generator may be used in place of the resistor. There can be a protective FUSE inside each capacitive module 200, in series just before the 220 positive output, and also a paralleled asymmetric conductance component in each capacitive module 200 (Cathode to 220 positive termination and Anode to negative termination) used to guarantee external bypass discharge current in the event one of a module short-circuit failure inside (in this case the discharging series would use (N−1) modules until subsequent repair, by swapping the failed capacitive module with a new one). The capacitive modules 200 are hot-swappable from their shelf housing enclosure.

Figure 2B:
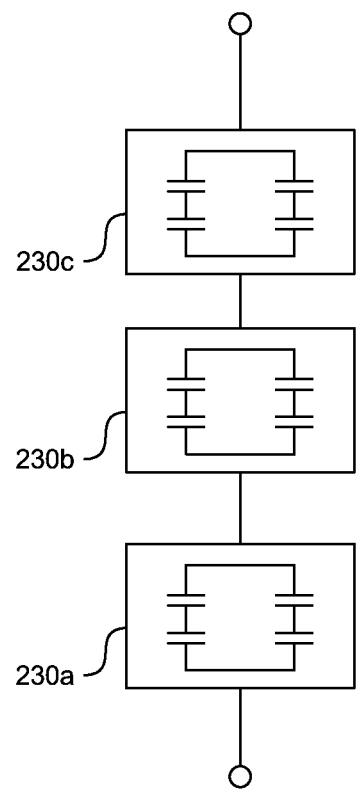
FIG. 2B is a block diagram illustrating one or more modular capacitive units, in accordance with various embodiments.

FIG. 2B is a block diagram illustrating one or more modular capacitive units 230 (e.g., a modular capacitive unit 230A, a modular capacitive unit 230B, and a modular capacitive unit 230C, collectively as the "modular capacitive units 230"), in accordance with various embodiments. The modular capacitive units 230 can have a modular enclosure for easy replacement and testing. For example, the modular capacitive units 230 can be enclosed in chassis housings, with faceplate handle for easy removal from the shelf housing enclosure. In some embodiments, the energy storage pack 216 includes the modular capacitive units 230. Each of the modular capacitive units 230 can include one or more series of capacitors (e.g., supercapacitors) in parallel with each other. In other embodiments, each of the modular capacitive units 230 has one or more capacitors coupled in series to both a resistor and an asymmetric conductance component that are in parallel to each other. Although the modular capacitive units 230 are illustrated to include only capacitors, in some embodiments, the modular capacitive units 230 can also include one or more batteries in series (or in parallel) with the capacitors.

Figure 3:
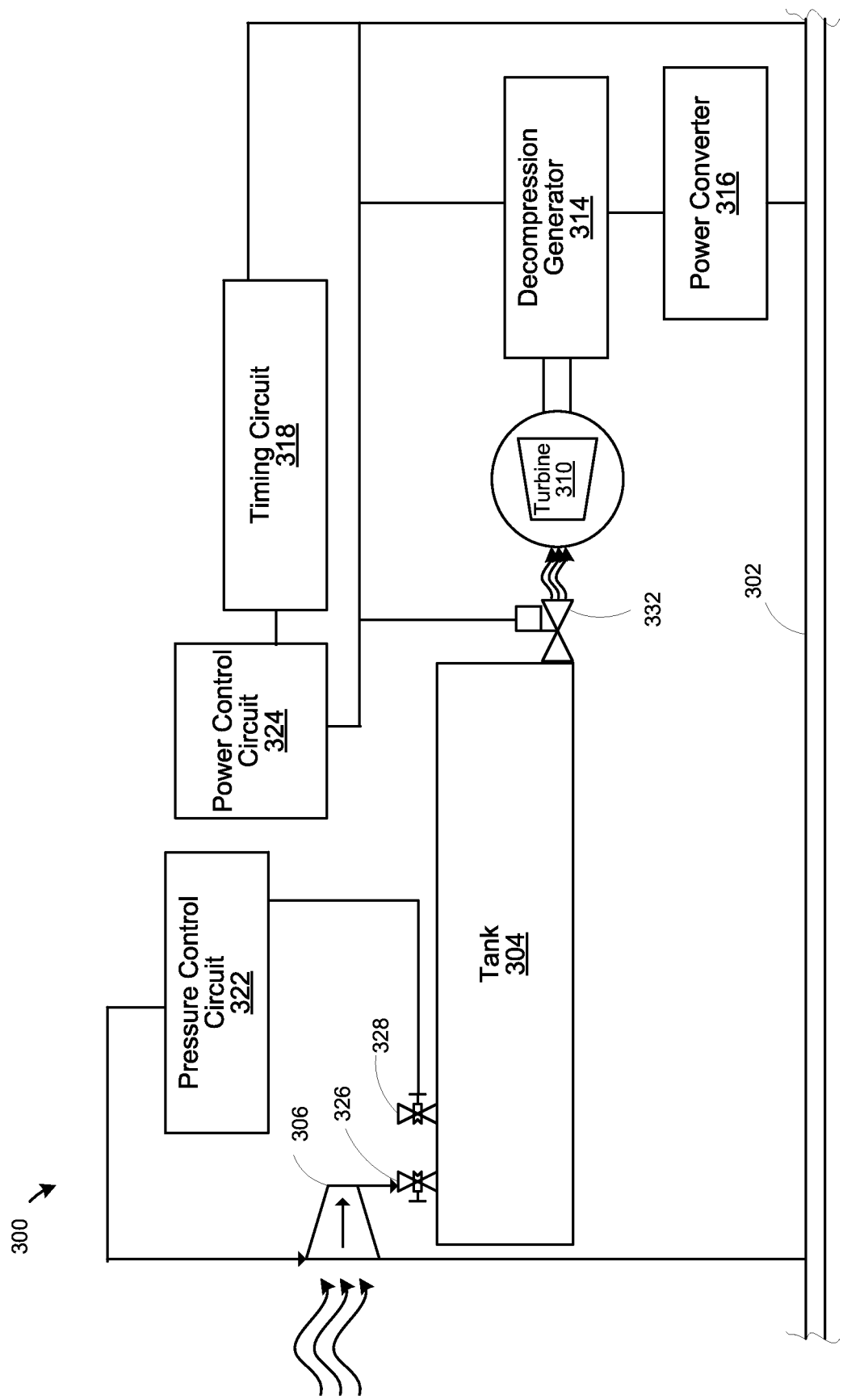
FIG. 3 is a block diagram illustrating a turbine-based generator system, in accordance with various embodiments.

FIG. 3 is a block diagram illustrating a turbine-based generator system 300 (e.g., the turbine-based generator system 140), in accordance with various embodiments. The turbine-based generator system 300 can generate electric power to a HVDC power line 302 when there is insufficient voltage (e.g., above a preset threshold voltage value) at the HVDC power line 302 (e.g., the HVDC power line 112). The turbine-based generator system 300 can include a tank 304, a compressor 306, a turbine 310, a decompression generator 314, or any combination thereof. In some embodiments, the turbine-based generator system 300 also includes a power converter 316 (e.g., an AC-DC converter, a DC-DC converter, or a simple feedback loop to the pressure control circuit 322 aimed to regulate keeping constant the HVDC voltage level during decompression under load, or any combination thereof). In some embodiments, the turbine-based generator system 300 includes a timing circuit 318, a pressure control circuit 322, a power control circuit 324, an intake valve 326, a pressure control valve 328, a release valve 332, or any combination thereof.

In several embodiments, the decompression generator 314 can generate HVDC power. Although the turbine-based generator system 300 is illustrated to be coupled to the HVDC power line 302, in other embodiments, the turbine-based generator system 300 is coupled instead to an AC power line. In these embodiments, the decompression generator 314 generates AC power output for the AC power line.

Prior to detecting a voltage drop on the AC side (e.g., representative of an AC power outage or failure of a power grid), the compressor 306 can draw power from AC power line 102 (or from the HVDC power line 302), to capture air surrounding the compressor 306 or gaseous substance from another tank into the tank 304 through the intake valve 326. This operation can be referred to as the air intake mode of the turbine-based generator system 300. In some embodiments, the intake valve 326 can include a pressure sensor that reports the current pressure in the tank 304 back to the compressor 306 or the pressure control circuit 322. The compressor 306 can be an electric motor driven compressor. In some embodiments, instead of capturing surrounding air, the compressor 306 can be periodically prefilled by a data center administrator with one or more other gaseous substances (e.g., nitrogen, helium, carbon dioxide, etc.) that would be recovered during decompression phase in to a larger tank.

In some embodiments, the pressure control circuit 322 is preconfigured to drive the compressor 306 to fill up the tank 304 up to a preset pressure range (e.g., 250 to 300 bar). After the tank 304 reaches the preset pressure range, the turbine-based generator system 300 can enter a passive standby waiting mode. When the pressure of the tank 304 is higher than the preset pressure, the pressure control circuit 322 can utilize the pressure control valve 328 to release some air or other gaseous substance to return the tank pressure back to the preset pressure range. In some embodiments, the pressure control valve 328 functions as a pressure measurement device for the pressure control circuit 322. In some embodiments, the pressure control valve 328 is an active device that automatically release air to maintain the tank pressure within the preset pressure range, if necessary. The pressure control valve 328 can be just a protective device if pressure exceeds safety limits. In some embodiments, the pressure control valve 328 is the same valve as the intake valve 326.

The turbine-based generator system 300 can detect power failure of the power grid by monitoring the AC power line 102. For example, the timing circuit 318 can monitor the voltage level at the AC power line 102. In some embodiments, when the AC voltage level fails, or drops below a voltage threshold, for more than a preset time duration (e.g., three seconds), the timing circuit 318 can trigger a power generation mode of the turbine-based generator system 300. In the power generation mode, the power control circuit 324 can open the release valve 332 to release air from the tank 304 into the turbine 310. The ambient pressure surrounding the tank 304 is much lower than the pressure inside the tank 304. Accordingly, air escapes the tank 304 at a high velocity after the release valve 332 is opened (e.g., adiabatic decompression). The released air pushes against the turbine 310 and thus turning the turbine 310. In turn, the turbine 310 rotates/moves the decompression generator 314.

The power control circuit 324 can ensure that sufficient power is generated to support the electrical loads of the HVDC power line 302. In some embodiments, when the voltage begins to drop, the power control circuit 324 signals to the release valve 332 and/or the decompression generator 314 to provide more power. For example, the release valve 332 can release more air to drive the turbine 310. The power control circuit 324 can further monitor the electrical characteristics of the HVDC power line 302 to regulate the voltage to prevent fluctuations caused by the nonlinear nature of decompression-based power generation. In some embodiments, pressure of the tank 304 is regulated to make the power output of the turbine-based generator system 300 more linear.

In some embodiments, the decompression generator 314 produces AC power instead of DC power. In those embodiments, the power converter 316 can serve as an AC-DC converter such that the turbine-based generator system 300 can provide HVDC power to the HVDC power line 302. In some embodiments, the decompression generator 314 produces DC power at a voltage level different from the HVDC power line 302. In those embodiments, the power converter 316 can serve as a DC-DC converter such that the turbine-based generator system 300 can provide HVDC power consistent with a preset voltage standard, or simply as a feedback control to the release valve 332 and so without using any intermediate power converter.

When compressing air into the tank 304, the tank 304 may heat up. During decompression of the tank 304, the air inside and released by the tank 304 can drop in temperature. Hence, in some embodiments, the turbine-based generator system 300 is positioned outside of a data center (e.g., on a rooftop of the data center) for which it serves. This positioning advantageously avoids temperature fluctuations inside the data center due to air compression and air decompression.

Figure 4:
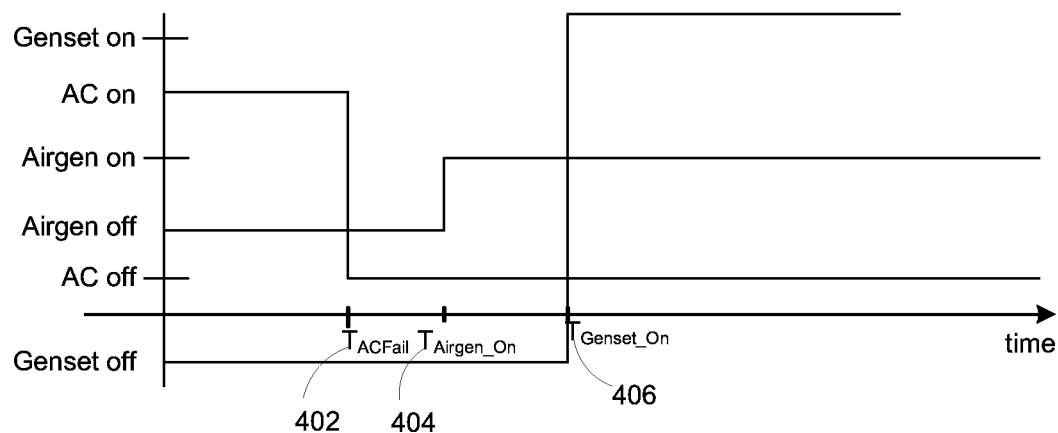
FIG. 4 is a timing diagram of powering ON and OFF redundant power systems in response to an AC power failure, in accordance with various embodiments.

FIG. 4 is a timing diagram of powering ON and OFF redundant power systems (e.g., the genset system 130, the capacitive backup power system 136, and/or the turbine-based generator system 140) in response to an AC power failure, in accordance with various embodiments. The timing diagram illustrates a response curve of a HVDC converter system (e.g., the HVDC converter circuit 110) coupled to an AC power grid (e.g., the power grid 106). In some embodiments, the timing of at least some of the redundant power systems can be controlled by a power switch. In some embodiments, at least some of the redundant power systems include a detection circuit (e.g., the timing circuit 318) to determine whether the AC power failure occurred. For example, the redundant power systems can be electrically coupled in parallel to the HVDC converter system, with or without an asymmetric conductance component, and share a circuit node (e.g., one or more circuit elements that share the same electrical potential). When the detection circuit detects that the AC input voltage changes or drops, the detection circuit can respond by turning on the redundant power system.

In the illustrated example, an AC power can fail at $T_{AcFail}$ 402. Within a short time (e.g., three seconds) after $T_{AcFail}$ 402, at $T_{AirGen\_On}$ 404, a turbine-based generator system (e.g., the turbine-based generator system 300) can turn ON (although not immediately providing sufficient and stable power). At $T_{Genset\_On}$ 406, a genset system (e.g., the genset system 130) can turn ON. In some embodiments, $T_{Genset\_On}$ 406 is the same as $T_{Air\text{-}Gen\_On}$ 404. In some embodiments, $T_{Genset\_On}$ 406 is a couple seconds (e.g., within three seconds) after $T_{AirGen\_On}$ 404.

Figure 5:
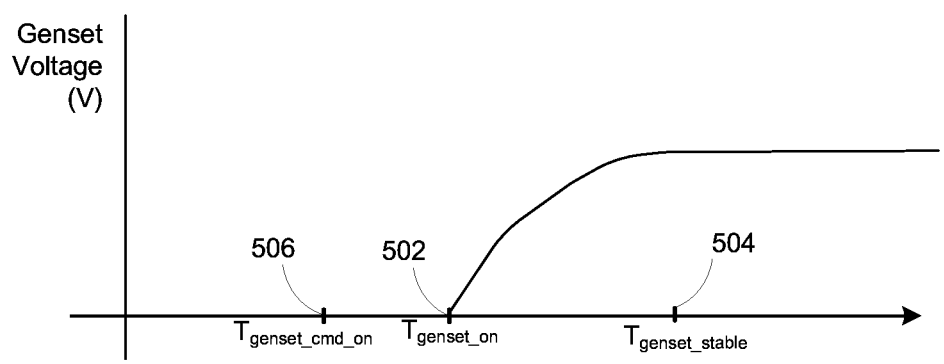
FIG. 5 is a graph diagram of an example voltage curve of a genset system, in accordance with various embodiments.

FIG. 5 is a graph diagram of an example voltage curve of a genset system (e.g., the genset system 130), in accordance with various embodiments. The x-axis represents a time dimension (e.g., measured seconds). The y-axis represents an electric potential/voltage dimension (e.g., measuring volts). The example voltage curve generates zero power (e.g., zero voltage) prior to the genset system turning ON. Once the genset system turns ON at $T_{genset\_on}$ 502 (e.g., $T_{Genset\_On}$ 406), the voltage curve begins to rise. However, the genset system does not generate stable and sufficient voltage/power until $T_{genset\_stable}$ 504. For example, the difference between $T_{genset\_on}$ 502 and $T_{genset\_stable}$ 504 can be approximately 25-90 seconds. $T_{genset\_on}$ 502 is the time point when the genset system starts to deliver voltage. However, the genset system can receive a command to turn ON before $T_{genset\_on}$ 502. For example, the genset system can receive the command to turn ON at $T_{genset\_cmd\_on}$ 506. The time delay between when the genset system receives the command to turn ON and when the voltage starts to actually raise at $T_{genset\_on}$ 502 can be several seconds. Once the genset system is finally ON and stable the voltage is constant, after $T_{genset\_stable}$ 504.

Figure 6:
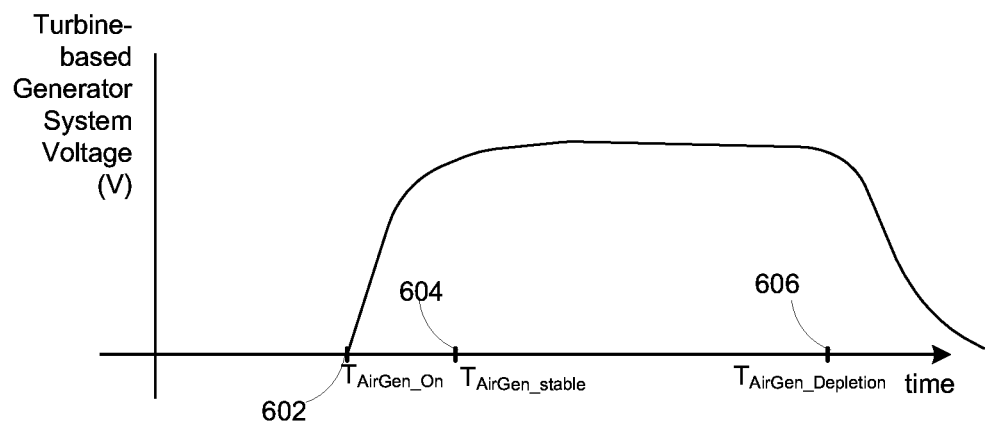
FIG. 6 is a graph diagram of an example voltage curve of a turbine-based generator coupled to a HVDC power line, in accordance with various embodiments.

FIG. 6 is a graph diagram of an example voltage curve of a turbine-based generator (e.g., the turbine-based generator system 140) coupled to a HVDC power line (e.g., the HVDC power line 112), in accordance with various embodiments. The x-axis represents a time dimension (e.g., measured seconds). The y-axis represents an electric potential/voltage dimension (e.g., measuring volts). The example voltage curve generates zero power (e.g., zero voltage) prior to the turbine-based generator system turning ON. Once the turbine-based generator system turns ON at $T_{AirGen\_on}$ 602 (e.g., $T_{AirGen\_On}$ 404), the voltage curve begins to rise. However, the genset system does not generate stable and sufficient voltage/power until $T_{AirGen\_stable}$ 604. For example, the difference between $T_{AirGen\_on}$ 602 and $T_{AirGen\_stable}$ 604 can be a few seconds. The voltage curve starts to drop rapidly after $T_{air\_depletion}$ 606 as the tank (e.g., the tank 304) begins to run out air or other gaseous substance and the pressure of the tank fails to provide sufficient air or gas flow to drive the decompression generator 314 to produce HVDC power. The difference between $T_{air\_depletion}$ 606 and $T_{AirGen\_on}$ 602 can be approximately 60-90 seconds.

Figure 7:
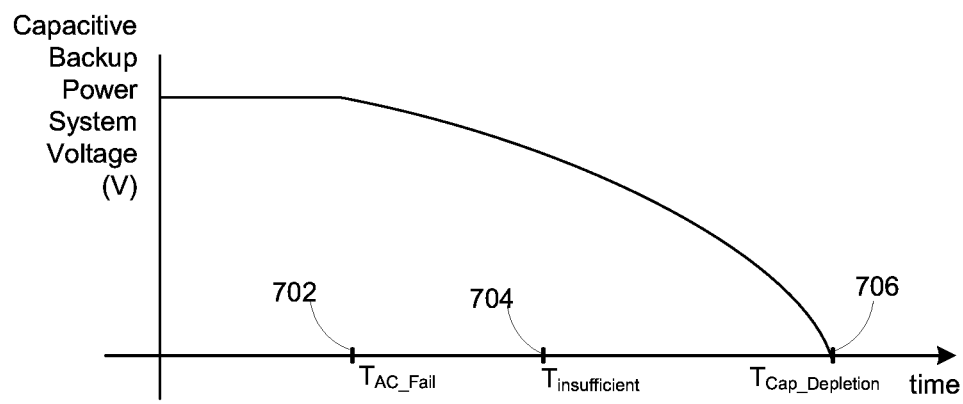
FIG. 7 is a graph diagram of an example voltage curve of a capacitive backup power system coupled to a HVDC power line, in accordance with various embodiments.

FIG. 7 is a graph diagram of an example voltage curve of a capacitive backup power system (e.g., the capacitive backup power system 136) coupled to a HVDC power line (e.g., the HVDC power line 112), in accordance with various embodiments. The x-axis represents a time dimension (e.g., measured seconds). This graph diagram illustrates a 'constant power' load type, as is typical of IT loads. The y-axis represents an electric potential/voltage dimension (e.g., measuring volts). The example voltage curve remains flat at a constant voltage as the capacitive backup power system is being kept charged by the HVDC power line (e.g., prior to an AC power failure). The HVDC power line also powers the IT load. Unlike the turbine-based generator system or the genset system, the capacitive backup power system can provide stable and sufficient electric current substantially instantaneously when the HVDC power line that it is attached to drops in voltage at $T_{AC\_Fail}$ 702 (e.g., $T_{AcFail}$ 402). The voltage curve starts to drop and reaches $T_{insufficient}$ 704 as capacitors within the capacitive backup power system can no longer fully support the electrical loads of the HVDC power line. For example, the difference between $T_{insufficient}$ 704 and $T_{AC\_Fail}$ 702 can be approximately 6-15 seconds. At this point, another redundant power system has to supplement electrical power of the capacitive backup power system to sustain the necessary voltage level of the HVDC power line. At $T_{cap\_deletion}$ 706, the capacitive backup power system completely runs out of charge. The voltage $T_{insufficient}$ 704 is the minimum input working voltage of the DC-DC converter 114.

In the illustrated example, the capacitive backup power system begins to discharge (e.g., take on the electrical load of the HVDC power line) immediately after $T_{AC\_Fail}$ 702, because the capacitor banks are directly connected in parallel to the HVDC bus during discharge (and that makes up to the 'inertial' behavior of the HVDC power network). In other embodiments, the capacitive backup power system can be configured to be actively connected to the HVDC power line at AC outage.

FIG. 8 is a method 800 of operating a power network system (e.g., the power network system 100), in accordance with various embodiments. During normal operation (e.g., prior to an AC power failure), the power network system relies on a grid-based power system that provides high voltage direct current (HVDC) power (e.g., via an AC-DC converter) to a server rack by converting alternating current (AC) power from a power grid. The HVDC power can be provided through a power line. During normal operation, at block 802, the power network system can charge and keep charged a capacitor-based backup power system (e.g., the capacitive backup power system 200) utilizing the HVDC power. The HVDC power can be converted from the AC power grid or already available via a HVDC power line. The HVDC power is also utilized to power the IT load during normal operations. In some embodiments, the capacitor-based backup power system can supplement extra HVDC power during peak power operation from IT load that extends beyond maximum power output of the grid-based power system.

Also during normal operation, at block 804, the power network system can compress air or gaseous substance into a tank coupled to a turbine-based generator. The compression is slow so not to extract sensible power from allocated IT load. For example, a compressor, powered by the HVDC power provided by the grid-based power system, or by the AC power grid, can capture air around the tank and compress the air or the gaseous substance into the tank. Although several embodiments disclosed use air as the content of the tank; in other embodiments, other gaseous substance can be used. Although several embodiments disclose an open loop air intake and release mechanism for the turbine-based generator, in other embodiments, the turbine-based generator can implement a closed-loop system (e.g., same gaseous content is decompressed and re-compressed into the tank(s) in cycles).

At block 806, the power network system detects a power failure (e.g., AC low-voltage due to AC failure or outage) of the grid-based power system (e.g., an AC power failure of the power grid or a HVDC power grid failure). At block 808, the power network system can provide power from the capacitor-based backup power system to the IT load (e.g., including the server rack). For example, the capacitor-based backup power system can switch on the power in response to the power failure. In another example, reactive/passive circuitry of the capacitor-based backup power system reactively draws from its capacitors when the voltage of the power line drops. When capacitor banks are in parallel to the HVDC power line through an asymmetric conductance component, the power release is instantaneous.

At block 810, the power network system can activate a turbine-based generator after detecting the power failure. The power network system can activate the turbine-based generator after a fixed time or a HVDC low-voltage threshold, after detecting the power failure. For example, a timing circuit can be configured to detect when a voltage level of the power line drops beyond a threshold and when a turbine is not turning. The timing circuit can be configured to cause the tank to release its content toward the turbine in response to detecting that the voltage level drops beyond the threshold or after a fixed time delay. The turbine-based electric power generator is activated and works using the energy released during air/gaseous substance decompression. The decompression is somewhat rapid making it closest to an adiabatic decompression type. The turbine-based generator, when active, can supplement and eventually replace electric power provided the capacitor-based backup power system, as the capacitor-based backup power system loses electric charge. The capacitor-based backup power system is also able to smooth all the transitions happening at AC outage and at AC restore, during the whole sequence. A DC output of the turbine-based generator can be coupled in parallel to the HVDC grid-based power system and the capacitor-based backup power system as shown.

At block 812, the power network system can activate a genset (e.g., the genset system 130) after detecting the power failure after a fixed delay. The power network system can activate the genset after a fixed delay after detecting the AC low-voltage or outage. The genset provides power prior to the exhaust of the tank of the turbine-based generator so that IT loads (e.g., server racks or any other load type) is powered by the genset from that moment onward. In some embodiments, the power network system can activate the turbine-based generator within a shorter delay, from when the power failure is detected, than the delay when activating the genset. In some embodiments, the power network system can activate the turbine-based generator substantially simultaneous to activating the genset. In some embodiments, after the genset is activated, the power network system can recharge the capacitor-based backup power system and/or compress air into the tank by drawing on the power generated by the genset.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A turbine-based generator system, comprising:
    a tank;
    a compressor configured to compress a gaseous substance into the tank;
    a turbine configured to be turned by decompression of the gaseous substance in the tank;
    a turbine-based generator configured to be driven by the turbine to generate electric power at a power cable coupled to a data center; and
    a timing circuit configured to detect when a voltage level of the power cable drops below a threshold voltage when the turbine is not turning and to cause the tank to release the gaseous substance toward the turbine in response to detecting that the voltage level drops below the threshold, or after a fixed time delay.

2. The turbine-based generator system of claim 1, wherein the tank includes an air valve coupled to the timing circuit and adapted to control a release of the gaseous substance from the tank.

3. The turbine-based generator system of claim 1, wherein the compressor is configured to capture open air surrounding the turbine-based generator system for compression into the tank, or to capture gaseous substance from another tank.

4. The turbine-based generator system of claim 1, wherein the generated electric power is high voltage direct current (HVDC) power.

5. The turbine-based generator system of claim 1, wherein the compressor is configured to be powered by the power cable when the power cable has sufficient voltage and the turbine is not turning.

6. The turbine-based generator system of claim 1, wherein the turbine-based generator is positioned outside of the data center such that temperature variation from the decompression does not affect at least one server rack in the data center.

7. The turbine-based generator system of claim 1, wherein the turbine-based generator comprises an adiabatic decompression generator.

8. A method, comprising:
    compressing, by a compressor, a gaseous substance into a tank;
    decompressing the gaseous substance in the tank to turn a turbine;
    generating electric power, by a turbine-based generator, at a power cable coupled to a data center by driving the turbine;
    detecting, by a timing circuit, when a voltage level of the power cable drops below a threshold voltage when the turbine is not turning; and
    releasing the gaseous substance from the tank toward the turbine in response to detecting that the voltage level drops below the threshold or after a fixed time delay.

9. The method of claim 8, wherein the tank includes an air valve coupled to the timing circuit and adapted to control a release of the gaseous substance from the tank.

10. The method of claim 8, wherein the compressor is configured to capture open air surrounding the turbine-based generator for compression into the tank or to capture the gaseous substance from another tank.

11. The method of claim 8, wherein the generated electric power is high voltage direct current (HVDC) power.

12. The method of claim 8, wherein the compressor is configured to be powered by the power cable when the power cable has sufficient voltage and the turbine is not turning.

13. The method of claim 8, wherein the turbine-based generator is positioned outside of the data center such that temperature variation from the decompression does not affect at least one server rack in the data center.

14. The method of claim 8, wherein the turbine-based generator comprises an adiabatic decompression generator.

15. A system comprising:
   a tank configured to receive a gaseous substance;
      a turbine configured to be turned by decompression of the gaseous substance in the tank;
      a turbine-based generator configured to be driven by the turbine to generate electric power at a power cable coupled to a data center; and
      a timing circuit configured to detect when a voltage level of the power cable drops below a threshold voltage when the turbine is not turning, wherein the timing circuit is configured to cause the tank to release the gaseous substance toward the turbine in response to detecting that the voltage level drops below the threshold.

16. The system of claim 15, wherein the timing circuit is further configured to cause the tank to release the gaseous substance toward the turbine after a fixed time delay.

17. The system of claim 15, wherein the tank includes an air valve coupled to the timing circuit and adapted to control a release of the gaseous substance from the tank.

18. The system of claim 15, further comprising a compressor configured to compress the gaseous substance into the tank.

19. The system of claim 18, wherein the compressor is configured to capture open air surrounding the turbine-based generator for compression into the tank.

20. The system of claim 18, wherein the compressor is configured to capture the gaseous substance from another tank.

* * * * *